Patented Feb. 16, 1943

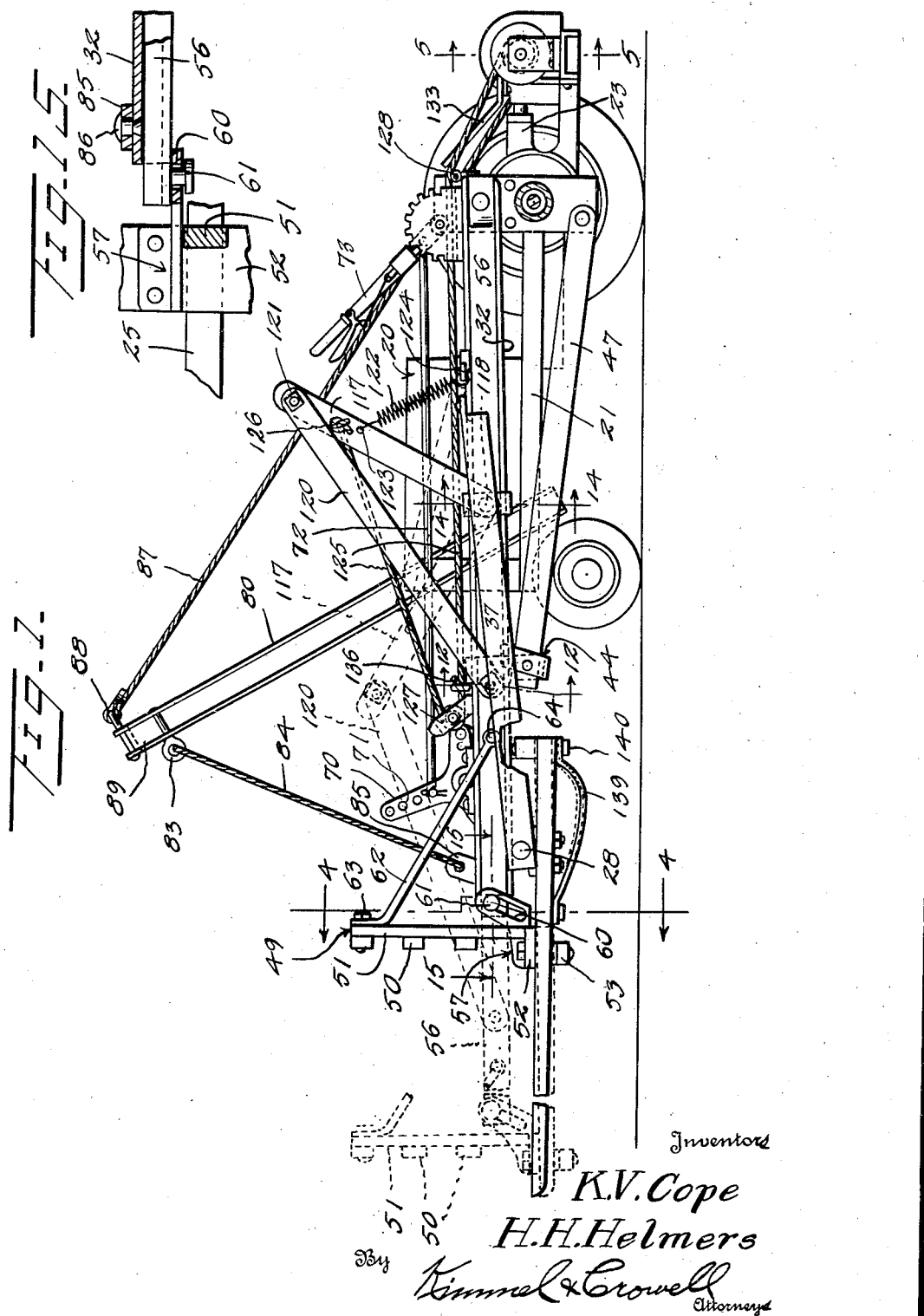

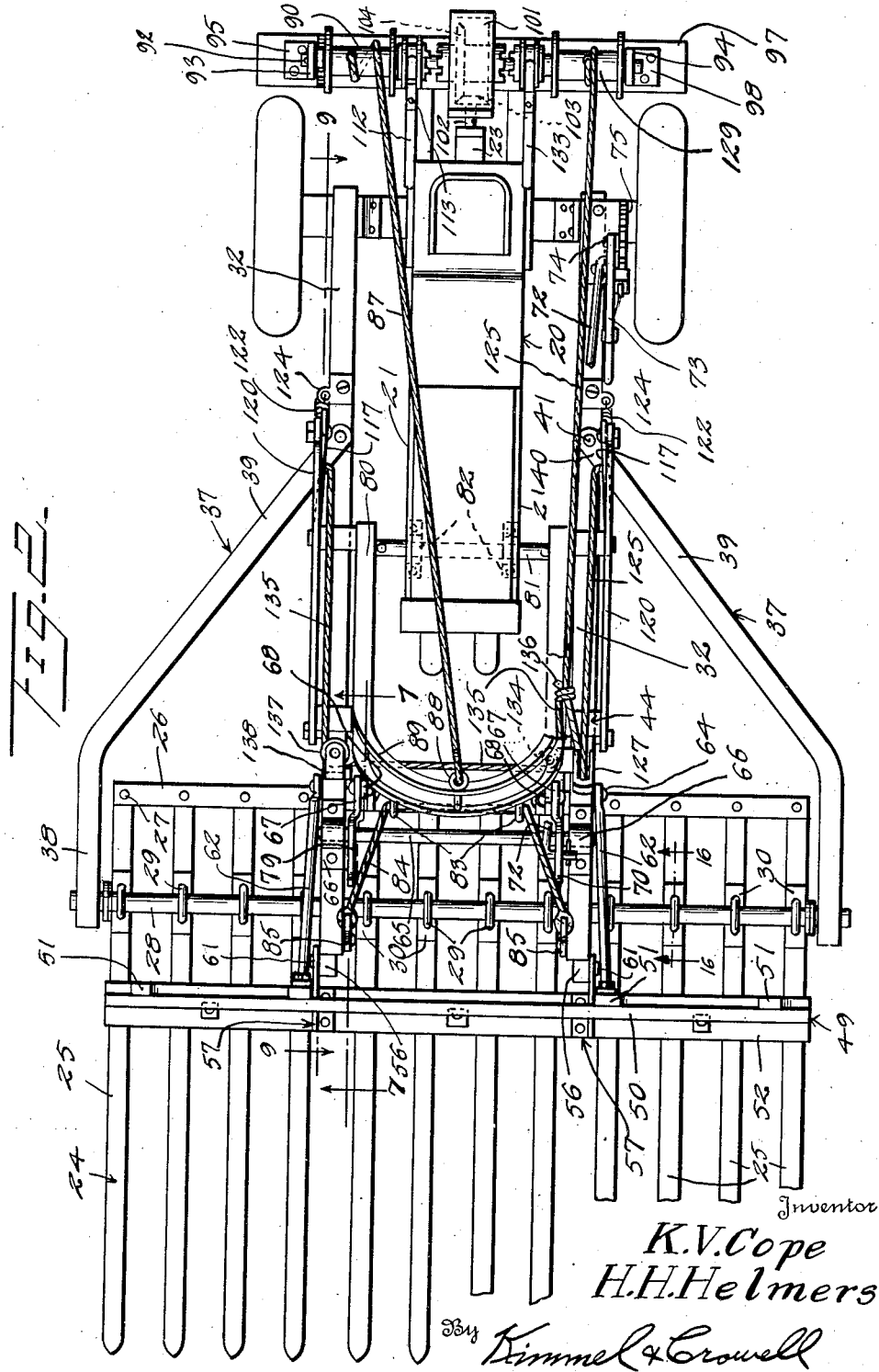

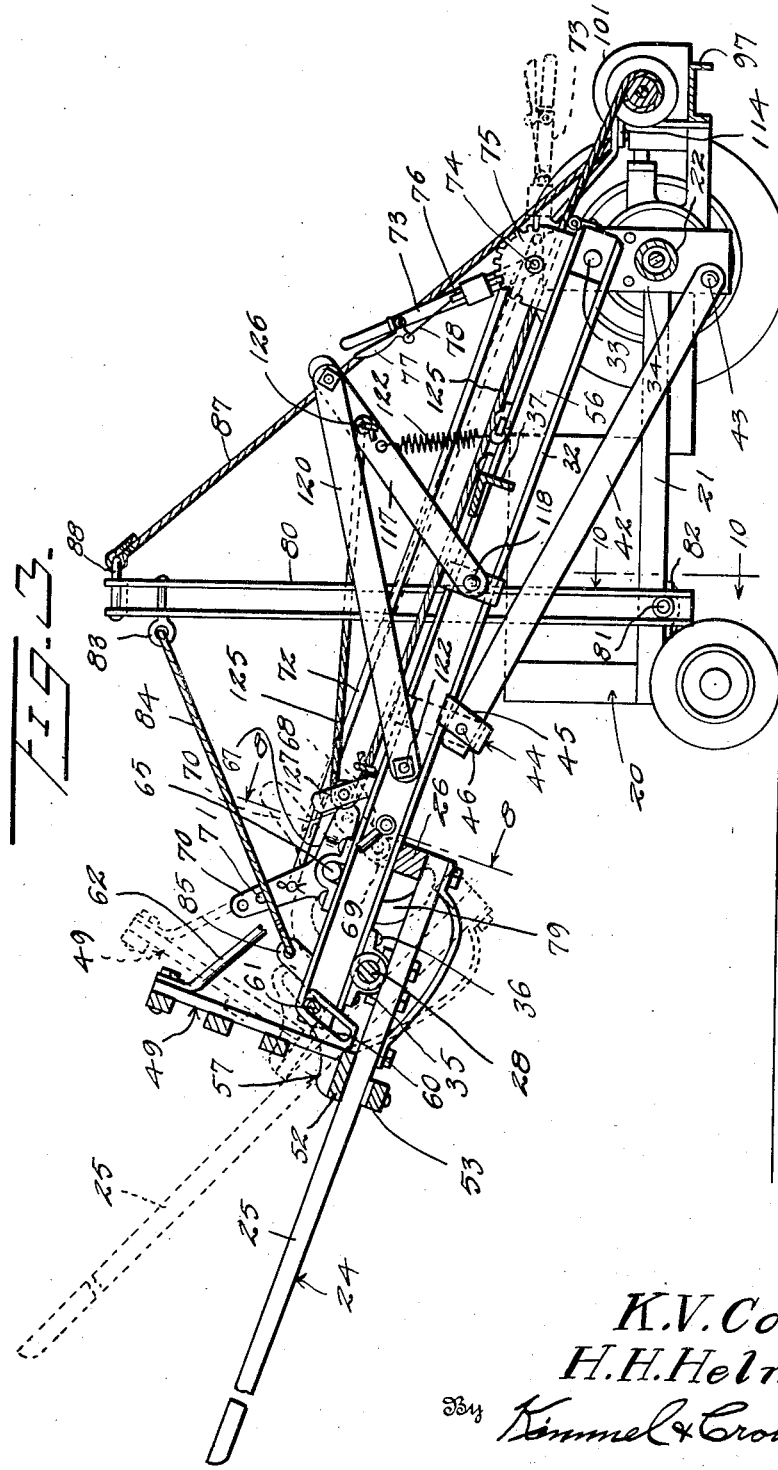

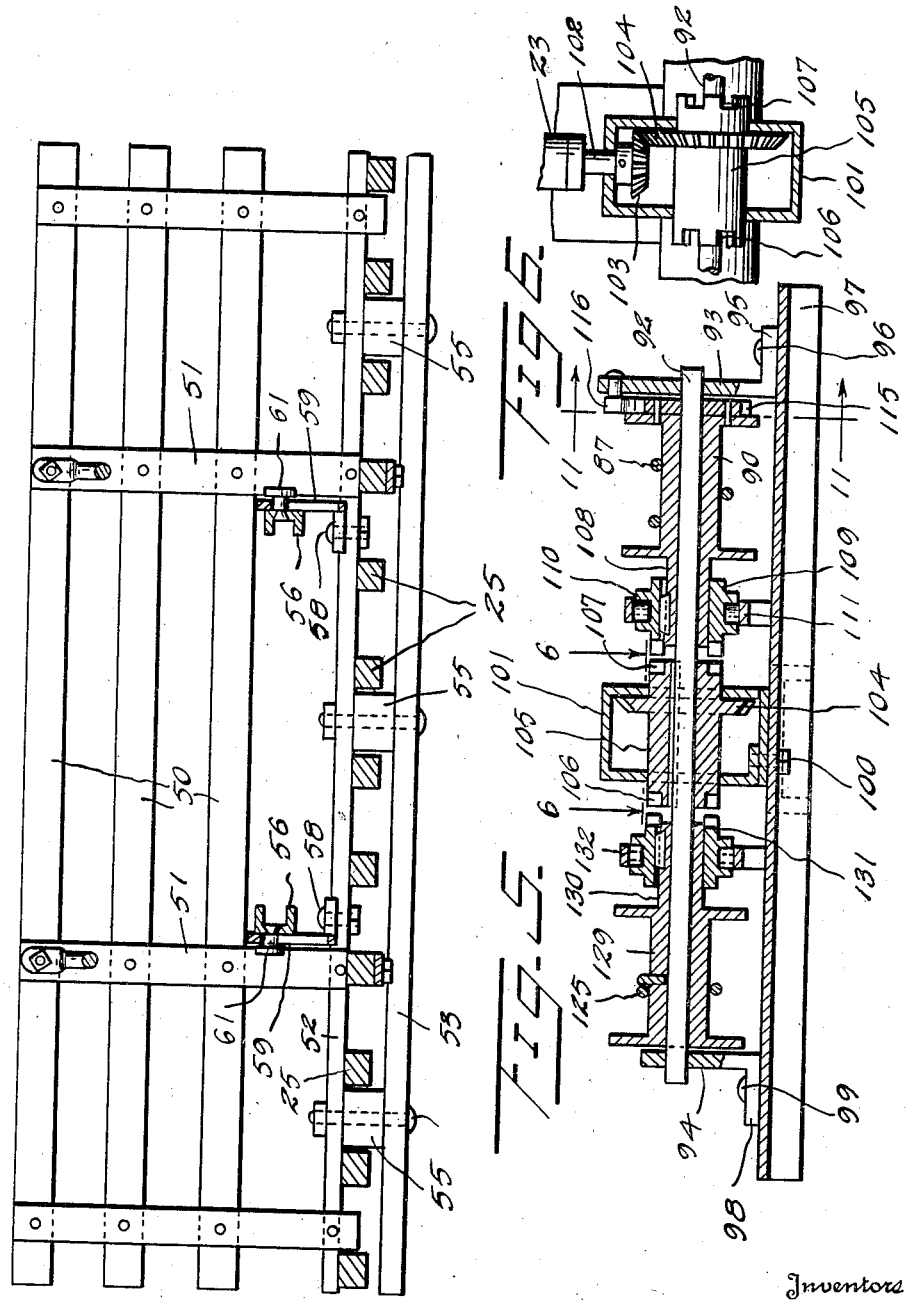

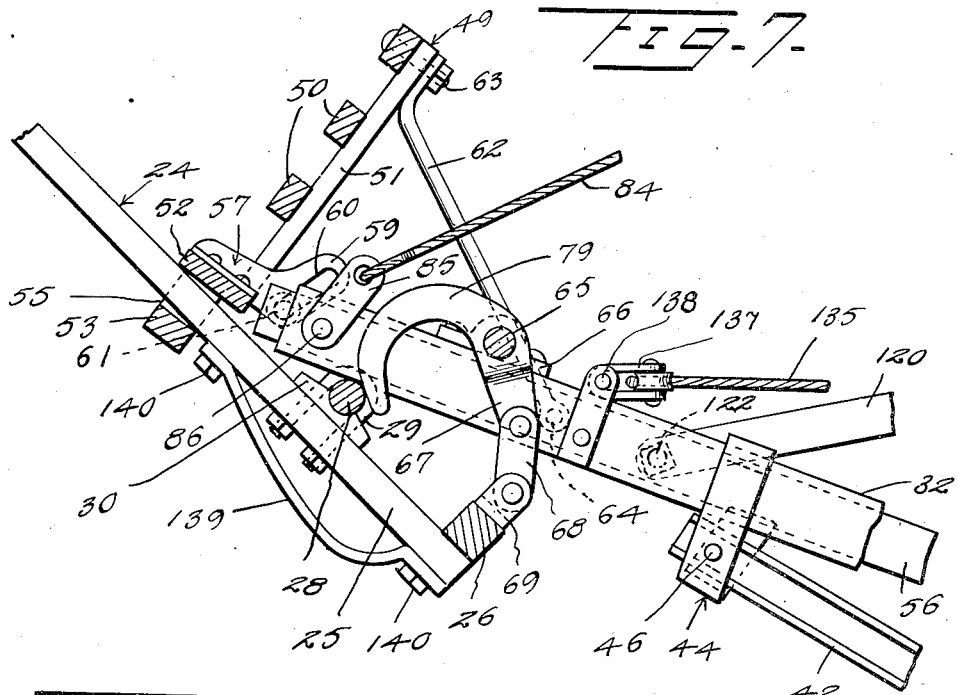
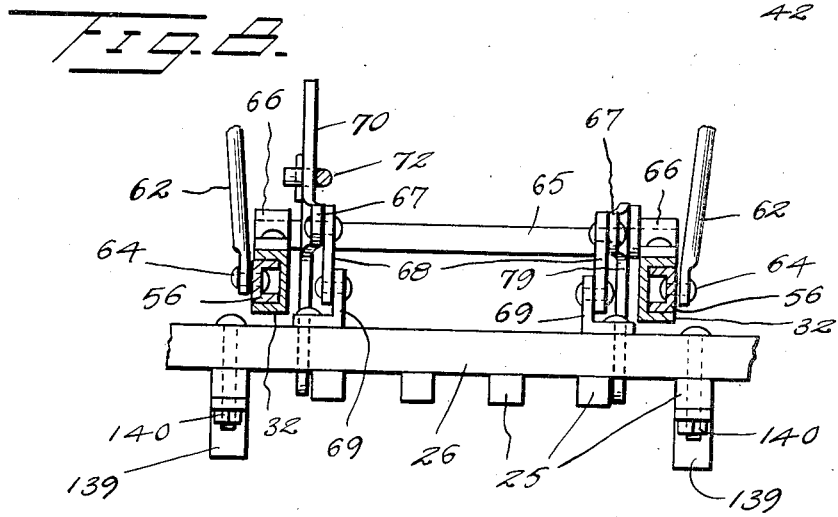

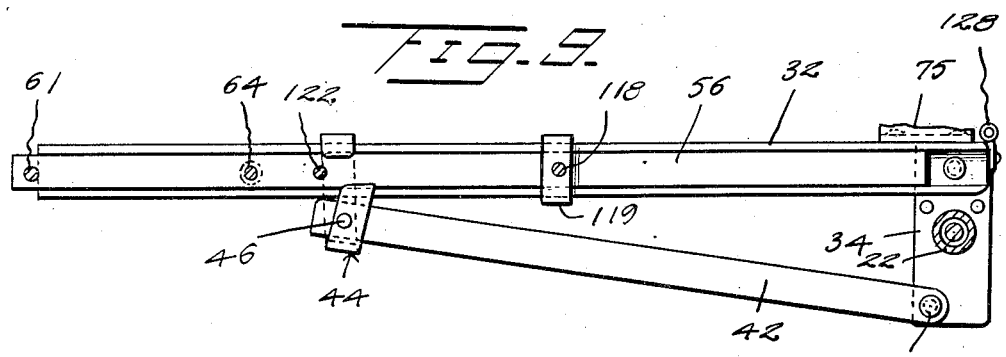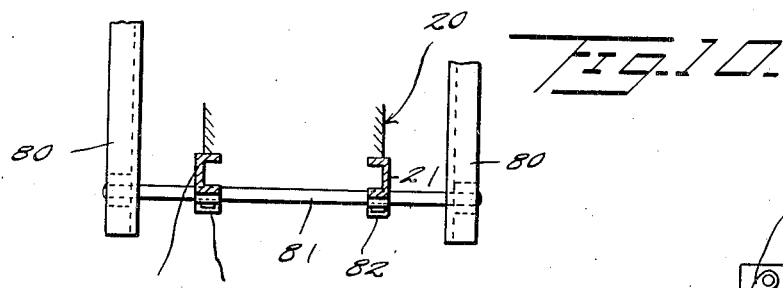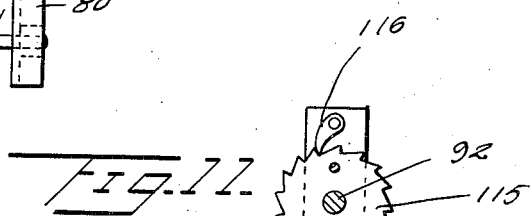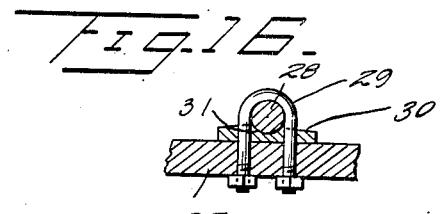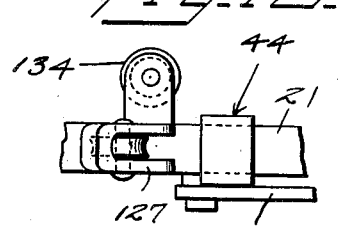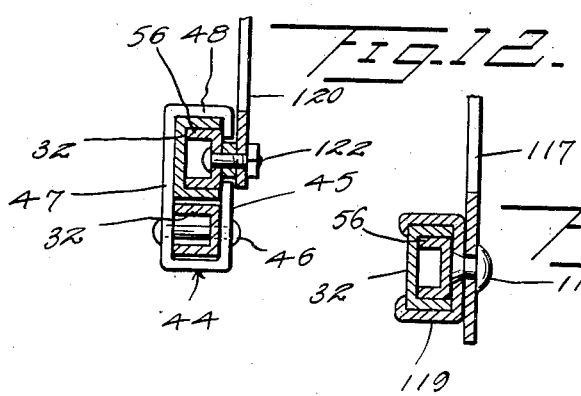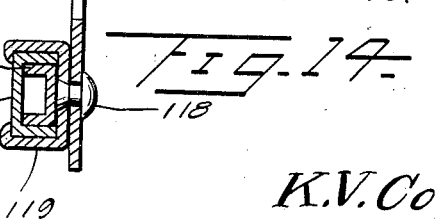

2,311,523

UNITED STATES PATENT OFFICE 2,311,523

COMBINATION HAY BUCK, STACKER, AND LOADER

Kenneth V. Cope and Henry Harm Helmers, Merrill, Iowa

Application February 3, 1941, Serial No. 377,258

13 Claims. (Cl. 214—140)

This invention relates to buck rake attachments for tractors.

An object of this invention is to provide a tractor attachment including a buck rake which is adapted to be mounted on a tractor, the attachment including means for elevating the rake in order to stack the material.

Another object of this invention is to provide a buck rake having a movable rear wall by means of which the material may be forcibly discharged off of the elevated rake.

A further object of this invention is to provide in a buck rake attachment of this kind, a pivoted rake carried by a swingable support whereby the rake may be tilted independent of the support so as to prevent the material from sliding off of the rake.

A still further object of this invention is to provide in a buck rake structure an improved rake which is pivotally carried by the swingable support so that the rake may be tilted relative to the support in any position of the support relative to the tractor.

A further object of this invention is to provide a buck rake of this kind including a movable rear wall which may be moved toward the outer ends of the rake tines for discharging the material therefrom and automatically retracted after the discharging operation.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail side elevation partly broken away and partly in section of a combined rake and loading attachment constructed according to an embodiment of this invention.

Figure 2 is a top plan of the device mounted on the tractor.

Figure 3 is a view similar to Figure 1, but showing the rake in an elevated position.

Figure 4 is a sectional view taken on the line 4—4 of Figure 1.

Figure 5 is a sectional view taken on the line 5—5 of Figure 1.

Figure 6 is a sectional view taken on the line 6—6 of Figure 5.

Figure 7 is a sectional view taken on the line 7—7 of Figure 2.

Figure 8 is a sectional view taken on the line 8—8 of Figure 3.

Figure 9 is a sectional view taken on the line 9—9 of Figure 2.

Figure 10 is a sectional view taken on the line 10—10 of Figure 3.

Figure 11 is a sectional view taken on the line 11—11 of Figure 5.

Figure 12 is a sectional view taken on the line 12—12 of Figure 1.

Figure 13 is a fragmentary plan view of a portion of the rear wall operating means for the rake.

Figure 14 is a sectional view taken on the line 14—14 of Figure 1.

Figure 15 is a sectional view taken on the line 15—15 of Figure 1, and Figure 16 is a section on line 16—16 of Figure 2.

Referring to the drawings, the numeral 20 designates generally a tractor structure including a frame 21 having an axle housing 22 at the rear thereof which is provided with a power take-off 23. In the present instance, the power take-off 23 extends rearwardly from the axle housing 22, but it will, of course, be understood that in certain types of tractors, the power take-off 23 is positioned along the side of the tractor structure. The type of tractor herein shown is only one example of a tractor with which the hereinafter described buck rate and loading structure may be combined.

A buck rake generally designated as 24 is positioned forwardly of the tractor 20 and includes a plurality of parallel tines 25, which are secured at their rear ends to a transversely extending tie bar 26 by means of fastening devices 27. The rake structure 24 is secured to a transversely disposed shaft 28, the shaft 28 being secured to the tines 25 forwardly of the connecting bar 26 by means of U-shaped clamping bolts 29. Preferably, the shaft 28 engages a bearing plate 30 which engages on the upper side of a tine 25 and which is provided with an arcuate bearing surface 31 on which the shaft 28 engages. There is a plate 30 on the upper surface of each tine 25 as shown in Figure 2 of the drawings.

The shaft 28 is supported for vertical swinging movement in a position forwardly of the tractor 20 by means of a pair of parallel channel or U-shaped supporting members 32 which are disposed on opposite sides of the tractor frame 21 and which are pivotally secured to the frame structure 21 by means of pivot members 33 which engage through vertically disposed plates 34 fixed to the frame 21 and the axle housing 22. The shaft 28 is rockably secured to the forward portions of the channel supporting bars or beams 32 by bearing members 35, which are fixed by fastening devices 36 to the undersides of the bars or beams 32. The outer ends of the shaft 28 are braced against bending by means of a pair of bracing bars or beams 37 which are of channel shape and are provided at their forward ends with a forward portion 38 disposed in parallel relation with the opposite sides or ends of the rake 24 and with an obtusely and rearwardly extending portion 39, which terminates in a lug or plate 40 fixed as by a fastening device 41 to a bar or beam 32 at a point forwardly from the rear end thereof.

Each bar or beam 32 is also braced by means of a lower bracing member 42, which is pivotally mounted as at 43 on the vertical plate 34 adjacent the lower end of the plate 34 and the forward end of each bracing member 42 is pivotally mounted in a substantially C-shaped slide member generally designated as 44. The forward end of each brace 42 is pivotally secured to an outer side 45 of a slide 44 by a pivot member 46. The outer side 45 of the slide member 44 overlaps a portion of the beam or bar 32 as shown in Figure 12 and the long side 47 of the slide 44 extends upwardly along the inner side of the beam or support 32 and terminates at its upper end in an L-shaped extension 48. The L-shaped extension 48 engages over the upper side of the channel member 32 and also extends downwardly along the outer side of the channel member 32 as shown in Figure 12. The rake structure 24 includes a movable rear wall 49 which is formed of a plurality of horizontally disposed bars 50 secured to uprights 51. The rear wall 49 is provided at the lower end thereof with a horizontally disposed bar 52 and a lower horizontally disposed bar 53 is disposed below the tines 25 and is secured to the upper horizontal bar 52 by fastening devices 54.

Spacing blocks 55 are disposed between the two bars 52 and 53 so as to dispose the bars 52 and 53 in spaced apart relation. These bars 52 and 53 comprise a means for slidably mounting the rear wall 49 of the rake structure on the tines 25. A pair of channel-shaped slide member 56 are slidably carried by the channel members 32 and the slide members 56 are secured at their forward ends to the rear wall 49. A substantially L-shaped plate 57 is secured as by fastening devices 58 to the upper horizontal bar 52 and each L-shaped plate 57 is provided with an obtusely disposed and upwardly inclined rear leg 59 having an elongated slot 60 therein. A headed pivot member 61 is fixed to the forward end of each slide member 56 and slidably engages in the slot 60. A bracing bar 62 is secured as at 63 to the back wall 49 and the bracing bar 62 extends rearwardly and downwardly and is pivotally secured as at 64 to a slide member 56.

The rake structure 24 is adapted to be tilted by means of a tilting shaft 65 which is rockably mounted in bearings 66 carried by each supporting beam or member 32. A pair of cranks or arms 67 are secured in spaced apart relation to the shaft 65 and are connected by means of a link 68 to a bracket 69 fixed to the rear rake connecting bar 26. An upwardly extending lever 70, which is formed with a plurality of spaced apart openings 71 is fixed to one of the arms or levers 67 and the forward end of a link or rod 72 is engaged in a selected one of the openings 71. The rear end of the rod 72 is pivotally secured in a shaft tilting lever 73, which is pivotally mounted as at 74 on a quadrant 75. The quadrant 75 is fixed to the rear end of one of the beams or supporting members 32.

The lever 73 is provided with a spring-pressed pawl 76, which is connected to a pawl operating lever 77 by means of a link 78. Each lever or arm 67 has formed integral therewith, an arcuate rake locking member 79 which as shown in full lines in Figure 3 is adapted to engage beneath the connecting bar 26 when the lever 73 is moved forwardly so as to hold the rake structure 24 against rocking or tilting movement. The locking members 79 are adapted to tightly hold the transverse connecting bar 26 against the undersides of the supporting beams or members 32. When the rake structure 24 is tilted upwardly by rearward movement of the hand lever 73, the rake structure 24 will assume the position shown in dotted lines in Figure 3 and in this position the rear wall 49 will also be inclined forwardly at a slight angle so as to position the rear wall 49 at an acute angle with respect to the length of the tines 25. When the rake structure 24 is tilted upwardly to the dotted line position shown in Figure 2, the plates 57 will move upwardly with respect to the forward ends of the slide members 56.

The rake structure 24 and the supporting members 32 are elevated or raised by means of a U-shaped rake elevating member 80, which is disposed in an inverted position and is pivotally mounted on a shaft 81 secured by attaching members 82 to the underside of the tractor frame 21. The elevating member 80 constitutes a substantially U-shaped lever and the elevating member 80 has secured to the forward side thereof a pair of eyes 83. A flexible member 84 engages loosely through the eyes 83 and has the opposite ends thereof secured to plates 85, which are fixed by fastening devices 86 to the inner side of each beam or channel member 32. A flexible member 87 is secured at one end to an eye 88 which is fixed to the center of the bight 89 of the elevating member 80 on the rear side thereof and the flexible member 87 comprises a rake elevating member and is trained about an elevating drum 90.

The drum 90 is rotatably mounted on a transversely disposed horizontal shaft 92, which is mounted at the opposite ends thereof in bearing members 93 and 94. The bearing member 93 is provided with a right angular lower leg 95 fixed by a fastening member 96 to a shaft supporting channel member 97. The bearing member 94 is provided with a right angular base leg 98 fixed by a fastening member 99 to the supporting member 97 and the supporting member 97 is fixed as by fastening devices 100 to a housing 101. The housing 101 extends rearwardly from the power take-off 23 and the power take-off shaft 102 projects into the housing 101 and is provided at its rear end with a bevelled gear 103 which meshes with a driven gear 104. The gear 104 is provided with a sleeve or hub 105, which is keyed to the shaft 92 and the opposite ends of the sleeve or hub 105 are provided with clutch elements 106 and 107. A sleeve 108 is fixed relative to the elevating drum 90 and a manually operable clutch element 109 is keyed to the sleeve 108 but is permitted sliding movement relative thereto and is formed with an annular groove 110 in which a clutch shifting fork 111 engages. The clutch shifting fork 111 is carried by a clutch shifting lever 112 pivotally mounted as at 113 on an ear 114 which may be carried by the housing 101. The drum 90 on the outer end thereof is provided with a ratchet 115 with which a pawl member 116 engages. The pawl member 116 is pivotally carried by the bearing member 93 and provides a means whereby the drum 90 may be held against rotation in one direction so as to hold the rake structure 24 in its elevated position. When the pawl member 116 is moved to a disengaged position relative to the ratchet 115, the rake structure including the supporting members 32 and the sliding members 56 are permitted to gravitatingly swing downwardly.

In order to provide a means whereby the rear wall 49 may be shifted forwardly to unload the material from the rake 24, I have provided a rock lever 117 which is pivotally mounted as at 118 on a substantially C-shaped attaching member 119. The attaching member 119 is constructed in the form of a strap which may be welded or otherwise fixedly secured to a channel member 32. A link 120 is pivotally secured as at 121 to the upper end of the lever 117 and is inclined forwardly and downwardly and pivotally secured as at 122 to the slide bar 56. A spring 122 is secured as at 123 to the lever 117 upwardly from the lower end thereof and is secured as at 124 to the beam or supporting member 32. The spring 122 is adapted to constantly urge the lever 117 to swing rearwardly and thus constantly urge the rear wall 49 to a loading position adjacent the rear portions of the tines 25. There are two of these levers 117 with a pair of links 120 and two springs 122. A flexible rear wall operating member 125 is secured as at 126 to one of the rock levers 117 and is then trained about a pulley or sheave 127 which is fixed relative to a supporting beam or member 32. The flexible member 25 is then extended rearwardly in substantially parallel relation with the beam or supporting member 32 and engages about a roller or idler 128 positioned at the rear of the beam or supporting member 32. The flexible member 125 is then wound about a back wall operating drum 129, which is rotatably mounted on the shaft 92 adjacent the bearing member 94 and on the side of the housing 101 opposite from the drum 90. The drum 129 has fixed thereto a tubular sleeve 130 which extends from the drum 129 in the direction of the clutch element 106. A slidable combined clutch element and rear wall trip 131 is carried by the sleeve 130 and is shifted relative to the clutch element 106 by means of a shifting fork 132 carried by a clutch shifting lever 133.

A second sheave 134 is disposed at right angles to the sheave 127 and a flexible member 135 is trained through the sheave 134 and is secured as at 136 to the flexible member 125 rearwardly of the sheave 127. The flexible member 125 is then extended through a pivoted sheave 137 which is pivotally mounted as at 138 on the supporting member 32 opposite from the supporting member carrying the sheave 127. The flexible member 135 is then extended rearwardly and is connected to the second rock lever 117 so that when the flexible member 125 is wound upon the back wall operating drum 129, the two rock levers 117 will be simultaneously rocked forwardly so that the two slide members 56 will move in unison and thereby push the back wall 49 straight forwardly toward the forward ends of the tines 25.

The rake structure 24 on the lower side thereof and adjacent the rear is provided with a pair of shoes 139 which are fixed as by fastening devices 140 to the underside of the rake structure 24. These shoes 139 are constructed in the form of a longitudinally bent flat metal bar which is adapted to contact with the ground in order that the rake structure 24 may be moved over the surface of the ground during the loading of the material on the rake.

In the use and operation of this rake structure, the attachment is secured to the tractor 20 by pivotally mounting the supporting members 32 on the plates 34 and pivotally securing the bracing members 42 as at 43 on the lower ends of the plate members 34. The rake elevating member 80 is pivotally secured to the frame 21 of the tractor and the drums 90 and 129 are disposed at the rear of the tractor and operatively connected with the power take-off 23. When it is desired to load the material on the rake structure 24, this structure is lowered by unwinding the flexible member 87 from the drum 90. At this time, the hand lever 73 is disposed at its forward position as shown in Figure 1 so that the tines 25 will be positioned substantially in contact with the ground and the shoes 139 will also be riding on the ground. After the material has been mounted on the rake structure 24, this structure is elevated to substantially the position shown in Figure 3 by shifting the clutch element 109 into engagement with the clutch element 107. This will wind the flexible member 87 on the drum 90 and rock the U-shaped elevating member 80 rearwardly. When the rake structure 24 is in an elevated position, the tractor 20 may be shifted to the desired position and at the same time the rake structure 24 may be tilted upwardly to substantially the dotted line position shown in Figure 3 by pulling the hand lever 73 rearwardly.

After the tractor has been shifted to the desired position and with the rake structure 24 in its elevated position but in the position shown in full lines in Figure 3, the material on the rake structure may be forcibly discharged therefrom by shifting the clutch element 131 into engagement with the clutch element 106. This will cause the cable 125 to wind on the drum 129 and pull the rock lever 117 forwardly. Forward movement of the rock levers 117 will push the back wall 49 to substantialy the dotted line position shown in Figure 1 at which time the material on the rake structure will be forcibly pushed therefrom.

By providing a rake structure wherein the tines may be tilted relative to the supporting means therefor, the material may be more readily retained on the rake structure particularly during the initial elevating of the rake structure, as it will be apparent that the rake structure 24 may if desired be tilted upwardly immediately after the rake structure has been loaded with the desired material and before the rake structure has been raised to an elevated position.

What we claim is:

1. A buck rake for attachment to a tractor comprising a rake, a shiftable supporting structure for and bodily carrying said rake, means swingably securing said structure on the tractor, means swingably mounting said rake on said structure, elevating means for said structure to thereby elevate the rake, and means for tilting upwardly said rake relative to said structure said elevating means being spring-controlled.

2. A buck rake for attachment to a tractor comprising a rake member, a combined elevating and swingable supporting means for and bodily said member, means pivotally securing the supporting means to said tractor, means swingably mounting said member on said supporting means, means for elevating said supporting means to thereby elevate said member, means for tilting upward said member relative to said supporting means, said latter means including means active in one position of said tilting means for locking said member in substantially parallel relation with respect to said supporting means slide means carried by said supporting means and a combined drum operating clutch and trip for said slide means.

3. A buck rake for attachment to a tractor comprising a rake structure, said rake structure including a plurality of spaced apart parallel tines, a rear upstanding wall for said tines, means slidably mounting said rear wall on said tines, means swingably supporting said rake structure on said tractor, slide means carried by said supporting means, means connecting said slide spring-controlled means pivotally connected to said slide means and pivotally mounted on said supporting means with said rear wall, and means for moving said slide means relative to said supporting means to thereby move said rear wall relative to said tines said last means including a combined drum operating clutch and trip mechanism.

4. A buck rake for attachment to a tractor comprising a rake structure, said rake structure including a plurality of spaced apart parallel tines, a rear upstanding wall for said tines, means slidably mounting said rear wall on said tines, means swingably supporting said rake structure on said tractor, slide means carried by said supporting means, means connecting said slide means with said rear wall, and tractor operated spring-controlled means pivotally connected with said slide means and pivotally supported from said supporting means for moving said rear wall outwardly along said tines to thereby discharge the material therefrom.

5. A buck rake for attachment to a tractor comprising a rake structure, said rake structure including a plurality of spaced apart parallel tines, a rear upstanding wall for said tines, means slidably mounting said rear wall on said tines, means swingably supporting said rake structure on said tractor, slide means carried by said supporting means, means connecting said slide means with said rear wall, tractor operated means pivotally connected with said slide means and pivotally supported from said supporting means for moving said rear wall outwardly along said lines to thereby discharge the material therefrom, and tensionable means connected to said tractor operated means and to said supporting means for automatically returning said rear wall to a rearmost position relative to said tines.

6. A buck rake attachment for a tractor comprising a rake member including a series of tines, a rear wall and a coupling bar for the rear ends of the tines, a shiftable combined upwardly tiltable and supporting structure for said member pivotally connected to the sides of, shiftable upwardly relative to and extending forwardly from the tractor over the rear terminal portion of said member, pivotal connection means between said portion and structure, means for tilting said structure upwardly, and an oppositely shiftable combined tilting and latching mechanism providing on one direction of its movement the correlation thereof with said bar for latching said member to and in parallel relation with respect to said structure to provide for the latter, when tilted upwardly bodily carrying said member therewith in a like direction and on the other direction of its movement to release said member and tilt the latter upwardly on said structure, and shifting means for said mechanism.

7. A buck rake attachment for a tractor comprising a rake member including a series of tines, a rear wall and a coupling bar for the rear ends of the tines, a shiftable combined upwardly tiltable and supporting structure for said member pivotally connected to the sides of, shiftable upwardly relative to and extending forwardly from the tractor over the rear terminal portion of said member, pivotal connection means between said portion and structure, means for tilting said structure upwardly, and an oppositely shiftable combined tilting and latching mechanism providing on one direction of its movement the correlation thereof with said bar for latching said member to and in parallel relation with respect to said structure to provide for the latter when tilted upwardly bodily carrying said member therewith in a like direction and on the other direction of its movement to release said member and tilt the latter upwardly on said structure, and shifting means for said mechanism, said wall having a loose connection between it and said tines whereby the wall may tilt rearwardly relative to the tines when the latter is tilted upwardly by said structure, oppositely movable slide means mounted in said structure and loosely connected to said wall for shifting the latter forwardly and rearwardly on said tines, and spring-controlled means for shifting said slide means.

8. A rake attachment for tractors having an upwardly tilting means for the rake and a rear wall for the latter, said attachment including means for loosely and slidably connecting said wall on and to the rake body, slide means mounted in said tilting means, means for loosely connecting said slide means to the said connecting means for the wall and rake body, and spring-controlled means pivotally supported from said tilting means and pivotally connected to said slide means for shifting said wall in opposite directions on said rake body and a combined drum operating clutch and trip mechanism for operating said spring-controlled means.

9. A rake attachment for tractors comprising a pair of depending plates connected to the sides of the tractor, an upwardly tiltable supporting structure arranged at the sides of and extending forwardly from the front of the tractor, said structure being pivotally connected at its rear to the upper part of said plates, bracing means for said structure arranged below and pivotally connected at its forward end to said structure intermediate the ends of the latter and pivotally at its rear end to the lower part of said plates, a rake extending forwardly with respect to the tractor and having its rear terminal portion arranged below the forward terminal portion of said structure, means for connecting the forward terminal portion of said structure to the rear terminal portion of the rake whereby the latter will be bodily carried by said structure, and means connected to said structure for tilting it and said rake upwardly simultaneously said means being spring-actuated through the means of a combined drum operating clutch and trip mechanism.

10. A rake attachment for tractors comprising a pair of depending plates connected to the sides of the tractor, an upwardly tiltable supporting structure arranged at the sides of and extending forwardly from the front of the tractor, said structure being pivotally connected at its rear to the upper part of said plates, bracing means for said structure arranged below and pivotally connected at its forward end to said structure intermediate the ends of the latter and pivotally at its rear end to the lower part of said plates, a rake extending forwardly with respect to the tractor and having its rear terminal portion arranged below the forward terminal portion of said structure, means for connecting the forward terminal portion of said structure to the rear terminal portion of the rake whereby the latter will be bodily carried by said structure, means connected to said structure for tilting it and said rake upwardly simultaneously, the means for connecting said terminal portions together permitting of the rake tilting upwardly on and relative to said structure, and means for tilting said rake upwardly relative to said structure, a rear upstanding wall for said tines, and spring-controlled means pivotally connected with said slide means and pivotally supported from said supporting means for moving said rear wall outwardly along said tines to thereby discharge the material therefrom.

11. A rake attachment for tractors comprising a pair of depending plates connected to the sides of the tractor, an upwardly tiltable supporting structure arranged at the sides of and extending forwardly from the front of the tractor, said structure being pivotally connected at its rear to the upper part of said plates, bracing means for said structure intermediate the ends of the latter and pivotally at its rear end to the lower part of said plates, a rake extending forwardly with respect to the tractor and having its rear terminal portion arranged below the forward terminal portion of said structure, means for connecting the forward terminal portion of said structure to the rear terminal portion of the rake whereby the latter will be bodily carried by said structure, means connected to said structure for tilting it and said rake upwardly simultaneously, said rake including a loosely and slidably mounted rear wall, slide means mounted in said structure, means for loosely connecting the forward end of said slide means to said rear wall, and spring-controlled means connected to said slide means for shifting it in opposite directions to provide for said wall moving from and towards the forward end of said structure.

12. A buck rake for attachment to a tractor comprising a rake structure, said rake including a plurality of spaced apart tines, a combined drum operating clutch and trip mechanism, an upstanding wall mounted on said rake, spring means for retracting said wall, said trip mechanism adapted to release said wall on said tines by means of a set of springs whereby said spring means may retract said wall.

13. A buck rake for attachment to a tractor comprising a rake structure including a plurality of spaced apart parallel tines, a rear upstanding wall for said tines, slide means connected with said rear wall, a combined drum operating clutch and trip mechanism, and yieldable means connected with said slide means and tensioned by movement of the latter to discharging position, release of said clutch and trip mechanism effecting retraction of said slide means under the action of said yieldable means.

KENNETH V. COPE.
HENRY HARM HELMERS.